June 20, 1939. F. COETERIER 2,163,270
ELECTRON DISCHARGE DEVICE
Filed July 20, 1937
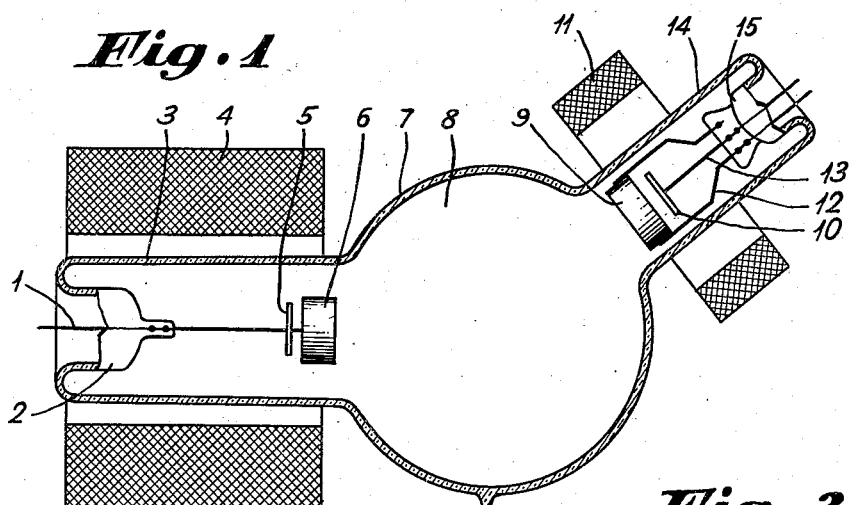
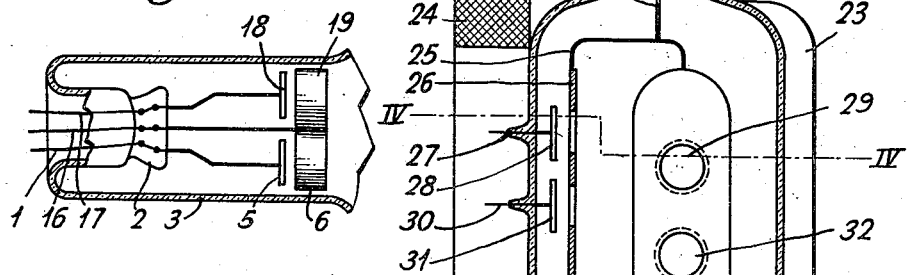
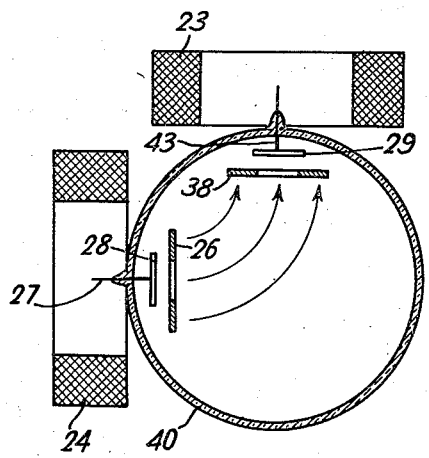
INVENTOR
FREDERIK COETERIER
BY
ATTORNEY Patented June 20, 1939

2,163,270

UNITED STATES PATENT OFFICE 2,163,270

ELECTRON DISCHARGE DEVICE

Frederik Coeterier, Eindhoven, Netherlands, assignor to N. V. Philips' Gloeilampenfabrieken, Eindhoven, Netherlands, a corporation of the Netherlands Application July 20, 1937, Serial No. 154,541
In Germany July 28, 1936

3 Claims. (Cl. 250—166)

For concentrating a cathode ray beam use is often made of a magnetic field. In contradistinction to the magnetic fields which serve for deflecting a cathode ray beam and which are directed across the main direction of the beam, the magnetic field whose lines of force extend in the main direction of the cathode ray beam is referred to as longitudinal field.

The part of the magnetic longitudinal field which biases the cathode rays need not be rectilinear. In a discharge device in which an image formed by electrons is projected on to an image area and the electron paths are directed by means of a magnetic longitudinal field, the axis of the image area may be at an angle with the axis of the photoelectric image producer, the axis of the magnetic field being curved in accordance with the desired bend of the ray beam. This does not interfere with the concentrating action of the longitudinal field.

It has, however, been found that the arcuate magnetic longitudinal field exercises apart from the concentrating action a further action on the ray beam, since the latter is deflected in a direction normal to the surface of curvature of the magnetic field, that is to say in a direction in respect of which the curve of the magnetic field has the left-hand sense of rotation, irrespective of whether the electrons are in step or in counterstep with the electric field.

The invention utilises this phenomenon for electron multiplication. According to the invention, a cathode ray beam (primary beam) is transmitted in a curved course by means of an arcuate magnetic longitudinal field to an impact surface capable of emitting secondary electrons. Due to the impact of the primary beam this surface emits in a greater degree secondary electrons which are accelerated by an electric field so that a new cathode ray beam (secondary beam) is produced which under the influence of the same magnetic field is curved and is deflected in the same direction as the primary beam normally to the surface of curvature of the magnetic field.

Due to the deflecting action of the arcuate magnetic longitudinal field the secondary beam evades the primary beam and can thus be retained. For this purpose provision is made for a suppressor surface which extends outside the primary beam. The new device is very suitable for the amplification of currents set up photoelectrically. In this case, the primary beam is emitted by a photoelectric cathode. If an optical image is projected on to the cathode, it is possible to produce on a fluorescent suppressor surface a visible image which has a greater brightness than or a colour different from the original image and does not coincide with it.

Preferably, the electrons of the primary beam are caused after their acceleration by the electric field, to traverse at a high speed a space free from any electric field and in which they are exposed to the action of the magnetic longitudinal field. In this case the impact surface may have arranged in front of it an electric field of retardation which also serves for accelerating the secondarily dislodged electrons. The electron multiplication obtained in accordance with the invention may be continued to a further extent. One or more further stages may be provided in such manner that the suppressor surface is also capable of emitting secondary electrons and, due to the impact of the secondary beam, becomes the source of a tertiary beam. This may be accelerated by an electric field and either be retained finally or again dislodge secondary electrons from its suppressor surface and so forth.

In order that the invention may be clearly understood and readily carried into effect two forms of construction of discharge tubes according to the invention may now be described more fully with reference to the accompanying drawing, in which they are shown diagrammatically.

Fig. 1 shows a device having a primary beam and a secondary beam.

Fig. 2 is a plan on part of this device.

Fig. 3 shows, by way of example, a device in which the amplification is brought about in several stages.

Fig. 4 is a cross-sectional view thereof taken on the line IV—IV of Figure 3.

The device shown in Fig. 1 comprises a high vacuum glass vessel 8 constituted by a spherical part 7 and extensions 3 and 14. The extension 3 which is sealed by a pinch 2 contains a cathode 5 formed by a metal screen coated with a readily emitting substance. Thus, for example, a silver surface may have applied to it a mixture of silver particles, caesium oxide particles and caesium by which a thin caesium film is absorbed. A wire 1 serves to supply current to the cathode. The cathode has arranged in front of it a metal ring 6 upon which may be impressed a given potential by way of conductor 16 (Figure 2). The ring 6 is say 5000 volts positive with respect to the cathode 5.

The extension 14 contains an impact surface 10 which has arranged in front of it a metal ring 9. A given potential is impressed upon the parts 3 and 10 via wires 12 and 13 which are taken out through the pinch 15. Thus, for example, the potential of the ring 9 is equal to that of the ring 6 and the potential of the surface 10 is for example 4500 volts lower, i. e. 500 volts positive with respect to the cathode 5.

The extension 3 is surrounded by a magnet coil 4 and the extension 14 by a magnet coil 11. Both coils are supplied with constant direct current and are so connected that magnetic lines of force pass through the coil 4 from the left to the right and then bending upwardly through the coil 11 from the centre of the glass vessel to the pinch 15.

Now, if electrons are emitted by the cathode 5, for example due to luminous irradiation, they are accelerated in the electric field between the plate 5 and the ring 6 and find their way into the spherical space 7 at a given speed which depends on the value of the potential difference between the ring 6 and the plate 5.

Due to the force action of the arcuate magnetic field of the coils 4 and 11 the cathode ray beam (referred to hereinafter as primary beam) is deflected in such manner that the electrons pass through the ring 9. They are retarded in the electric field between the ring 9 and the plate 10 and impinge on the plate 10 at a speed which corresponds to the potential difference between the plates 5 and 10 (which in the above assumed example is 500 volts).

Since the cathode rays are deflected not only in the surface of the drawing but also to a slight extent normally thereto, that is to say, in a backward direction into the drawing, the cathode 5 is arranged slightly in front of the surface of symmetry of the tube according to Fig. 2, whereas the plate 10 is located symmetrically.

The metal plate 10 is coated with a substance that readily emits secondary electrons so that due to the impact of the electrons of the primary beam it emits electrons in a greater number than impinge on it out of the primary beam.

The substance used for constituting the plate 10 may also be a mixture of silver and caesium oxide with an adsorbed caesium film. Other substances may be used such, for example, as willemite by which the caesium is adsorbed or a carbon surface by which a metal as magnesium is adsorbed.

The electrons secondarily dislodged from the plate 10 are accelerated in the electric field between the ring 9 and the impact surface 10 so that a new cathode ray beam, a secondary beam, is produced which has a greater intensity than the primary beam. The secondary beam is deflected by the magnetic longitudinal field set up by the coils 4 and 11 in a right hand sense of rotation for the observer of Fig. 1, but since it is also deflected in a backward direction it does not coincide with the primary beam but impinges on the suppressor plate 18 which is arranged behind the cathode 5 and which is screened by the ring 19 connected to the ring 6. The current is conducted away by the wire 17 which is connected to the plate 18 and the plate 18 has impressed upon it a given potential. The suppressor plate 18 may have the same potential as the rings 6 and 19 so that the electrons impinge on it at a speed which corresponds to a voltage of 4500 volts.

The cathode 5 may be caused to emit by other means. Thus, for example, it may be constructed as an incandescent cathode. In this case the described device may serve as an amplifying tube. If it is provided with a photoelectric cathode it may act as a light transformer. The cathode plate 5 has projected on it for example a luminous image. In some cases this may be an image which is not perceptible to the eye and which is produced by ultra-violet or infrared rays. The plate 18 has then produced on it by the secondary beam an image which corresponds exactly to the optical image and can be made visible by the said plate being coated with a fluorescent layer. The device can thus be made suitable for observing bodies which are concealed to the human eye by a medium, such as a fog, which absorbs visible light but transmits infra-red rays to a greater or less extent. Alternatively, a photographic layer may be used in a manner known per se in order that the image may be made perceptible.

The device shown in Figs. 3 and 4 operates in a manner similar to that of the device hereinbefore described but the same action is repeated several times and thus a substantially greater electron multiplication is obtained.

A high vacuum glass vessel 40 contains two apertured plates 26 and 38 which are normal to each other. The former has formed in it four and the second three apertures in such manner that the apertures of the plate 38 are arranged in respect of height between the apertures of the plate 26. The two plates are interconnected by metal straps 25 and 39 but at the top of the discharge vessel a small supporting rod 22 secured to the strap 25 is maintained in position in the sealing-off tip 21 and at the bottom end the wire 42 secured to the strap 39 is sealed in the pinch 41.

The apertures of the plate 26 have arranged behind them plate-shaped electrodes 37, 34, 31 and 28 in view of which the former serves as a cathode and the latter as the final suppressor screen. The apertures of the plate 38 have arranged behind them metal plates 35, 32 and 29 which serve as impact surfaces and are coated with material capable of emitting secondary electrons. The plates 37, 34, 31 and 28 are provided with leading-in wires 36, 33, 30 and 27 sealed in the glass wall 40. The plates 35, 32 and 29 are also provided with such leading-in wires, one of which, the wire 43 secured to the plate 29, is shown in Fig. 4.

Externally of the tube are arranged two magnet coils 24 and 23 which are interconnected in such manner that the magnetic field in the tube extends as indicated in Fig. 4 by arrows.

The plates 37, 35, 34, 32, 31 and 29 have applied to them negative voltages in respect of the plates 26 and 38, the potential differences decreasing, however, from the plate 37 towards the plate 29. The plate 28 may have the same potential as the plates 26 and 38 and in some cases also a lower potential. The primary beam which issues from the cathode plate 37 and which is directed by the magnetic filed on to the impact surface 35 produces in situ secondary electrons which in the form of a secondary beam thrown on to a plate 34. The latter has, similarly to the plate 35, a coating which readily emits electrons so that a tertiary cathode ray beam is produced which does not coincide with the secondary beam but impinges on the plate 32 that is capable of emitting secondary electrons. Thus electron currents are produced which increases more and more in intensity until eventually after amplification of five-fold the cathode ray beam produced between the impact surface 29 and the plate 38 impinges on the suppressor surface 28 and may produce here a visible or a photographic image.

Many variations within the scope of the invention are possible. Thus, for example permanent magnets may be substituted for the coils. In addition, the electrode systems may be constructed in any different manner and further screens for the correct formation of the electric field or for making the deflecting space free from any field may be used.

What I claim is:

1. An electronic discharge device comprising an envelope, a photo-cathode and an anode, means positioning said cathode and anode in a common plane and displaced from each other, electron accelerating means positioned near said cathode and said anode, an impact electrode, means maintaining said impact electrode in a plane at an angle to the plane of said cathode and anode, the axis of said impact electrode being substantially midway between the axes of said cathode and said anode, electron accelerating means positioned adjacent said electrode, and means for creating a curved magnetic field parallel to the axes of said cathode, anode and impact electrodes.

2. An electronic discharge device comprising an envelope, an electron emitter and an anode, means positioning said emitter and anode adjacently and in a common plane, an impact electrode capable of emitting secondary electrons, means positioning said impact electrode in a plane at an angle to the plane of said emitter and anode, the axis of said electrode being directed substantially midway between the axes of said emitter and said anode, electron accelerating means positioned adjacent said emitter, anode and electrode, and means for producing a curved magnetic field normal to the plane of said anode and the plane of said electrode.

3. An electronic discharge device comprising an envelope, an electron emitting surface and an anode, means positioning said surface and said anode in a common plane, an impact electrode capable of emitting secondary electrons positioned between and in the plane of said surface and said anode, a plurality of impact electrodes positioned in another plane at an angle to the plane of said surface and said anode, the axes of said plurality of impact electrodes being arranged in staggered relation with respect to the axes of said emitting surface, said anode and said first mentioned impact electrode, an electron accelerating electrode adjacent said surface, said anode and said impact electrodes, and means for producing a curved magnetic field parallel to the axes of said surface, said anode and said impact electrodes.

FREDERIK COETERIER.